US009262485B2

(12) United States Patent
Hardt et al.

(10) Patent No.: US 9,262,485 B2
(45) Date of Patent: Feb. 16, 2016

(54) IDENTIFYING A SKETCHING MATRIX USED BY A LINEAR SKETCH

(71) Applicant: International Business Machines Corporation, Armonk, NY (US)

(72) Inventors: Moritz Hardt, San Mateo, CA (US); David P. Woodruff, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 13/965,253

(22) Filed: Aug. 13, 2013

(65) Prior Publication Data

US 2015/0052172 A1 Feb. 19, 2015

(51) Int. Cl.
*G06F 17/30* (2006.01)

(52) U.S. Cl.
CPC .... *G06F 17/30536* (2013.01); *G06F 17/30542* (2013.01)

(58) Field of Classification Search
None
See application file for complete search history.

(56) References Cited

U.S. PATENT DOCUMENTS

| | | | |
|---|---|---|---|
| 6,327,601 B1 | 12/2001 | Hung | |
| 7,328,220 B2 | 2/2008 | Dobra et al. | |
| 7,624,095 B2 * | 11/2009 | Majumder | 705/7.29 |
| 7,668,852 B2 * | 2/2010 | Eshghi et al. | 707/803 |
| 7,844,652 B2 | 11/2010 | Li et al. | |
| 8,310,922 B2 | 11/2012 | Nelson et al. | |
| 2005/0039086 A1 | 2/2005 | Krishnamurthy et al. | |
| 2007/0136225 A1 * | 6/2007 | Church et al. | 706/62 |
| 2007/0240061 A1 | 10/2007 | Cormode et al. | |
| 2009/0012984 A1 * | 1/2009 | Ravid | G06F 17/30705 |
| 2009/0303901 A1 * | 12/2009 | Duffield et al. | 370/253 |
| 2010/0179933 A1 * | 7/2010 | Bai | G06F 17/30663 706/12 |
| 2011/0270835 A1 * | 11/2011 | Clarkson et al. | 707/737 |
| 2011/0282865 A1 * | 11/2011 | Talwar | G06F 17/30424 707/722 |
| 2012/0203717 A1 * | 8/2012 | Xu | H04L 9/3236 706/12 |
| 2013/0054798 A1 | 2/2013 | Cormode et al. | |
| 2013/0070624 A1 * | 3/2013 | Nguyen | H03M 7/30 370/252 |
| 2014/0283091 A1 * | 9/2014 | Zhang | G06F 21/60 726/26 |

OTHER PUBLICATIONS

Graham Cormode, "Sketch Techniques for Approximate Query Processing", 2010.*
Cormode et al., "Algorithms for Distributed Functional Monitoring", Hong Kong university of Science and Technology, ACM Transactions on Algorithms, vol. 7, No. 2, Article 21, Publication Date: Mar. 2011; pp. 21-21:20.
Puttagunta, et al. "Linear Sketches for Approximate Aggregate Range Queries", Computer Science and Electrical Engineering Department; University of Maryland Baltimore County, Dec. 1, 2003; pp. 1-31.

* cited by examiner

*Primary Examiner* — Hung Le
(74) *Attorney, Agent, or Firm* — Cantor Colburn LLP

(57) ABSTRACT

Embodiments relate to identifying a sketching matrix used by a linear sketch. Aspects include receiving an initial output of the linear sketch, generating a query vector and inputting the query vector into the linear sketch. Aspects further include receiving an revised output of the linear sketch based on inputting the query vector and iteratively repeating the steps of generating the query vector, inputting the query vector into the linear sketch, and receiving an revised output of the linear sketch based on inputting the query vector until the sketching matrix used by the linear sketch can be identified.

20 Claims, 4 Drawing Sheets

Input: Oracle $\mathcal{A}$ providing access to a function $f: \mathbb{R}^n \to \{0,1\}$, parameter $B \gg 4$.

Attack: Let $V_1 = \{0\}$, $m = O(B^{13}n^{11}\log^{15}(n))$, and $S = [3/4, B] \cap \varepsilon \mathbb{Z}$ where $\varepsilon = 1/20(Bn)^2\log(Bn)$.

For $t = 1$ to $t = r + 1$:

1. For each $\sigma^2 \in S$:

(a) Sample $g_1, \ldots, g_m \sim G(V_t^{\perp}, \sigma^2)$. Query $\mathcal{A}$ on each $g_i$. Let $a_i = \mathcal{A}(g_i)$.

(b) Let $s(t, \sigma^2) = \frac{1}{m}\sum_{i=1}^{m} a_i$ denote the fraction of samples that are positively labeled.
   - If either $s(t, \sigma^2) \leq 1-\varepsilon$, or $\sigma^2 \leq 2$ and $s(t, \sigma^2) \geq \varepsilon$, then terminate and output $(V_t^{\perp}, \sigma^2)$ as a purported failure certificate.
   - Else let $g'_1, \ldots, g'_{m'}$ be the vectors such that $\mathcal{A}(g_i) = 1$ for all $i \in [m']$.

(c) If $m' < m/100B^2n$, proceed to the next $\sigma$. Else, compute $v_\sigma \in \mathbb{R}^n$ as the maximizer of the objective function $z(v) = \frac{1}{m'}\sum_{i=1}^{m'} \langle v, g'_i \rangle^2$.

2. Let $v^*$ denote the first vector $v_\sigma$ that achieved objective function $(\sigma^2 + 1/4) + \Delta$ where $\Delta = 1/7Bn$.
   - If no such $v_\sigma$ was found, let $V_{t+1} = V_t$ and proceed to the next round.
   - Else let $v_t = v^* - \frac{\sum_{v \in V_t} v \langle v, v^* \rangle}{\prod_{v \in V_t} \langle v, v, v^* \rangle}$ and put $V_{t+1} = V_t \cup \{v_t\}$.

FIG. 3

IDENTIFYING A SKETCHING MATRIX USED BY A LINEAR SKETCH

BACKGROUND

The present disclosure relates generally to linear sketches, and more specifically, to identifying a sketching matrix used by a linear sketch.

Recent years have witnessed an explosion in the amount of available data, such as that in data warehouses, the Internet, sensor networks, and transaction logs. The need to process this data efficiently has led to the emergence of new fields, including compressed sensing, data stream algorithms and distributed functional monitoring. A common technique used across these fields is the use of linear sketches. Linear sketching involves specifying a distribution it over linear maps $A: \mathbb{R}^n \to \mathbb{R}^r$ for a value $r \ll n$. A matrix A is sampled from $\pi$. Then a vector $x \in \mathbb{R}^n$ is presented to the algorithm, which maintains the "sketch" Ax, which provides a concise summary of x, from which various queries about x can be approximately answered. The storage and number of linear measurements (rows of A) required is proportional to r. The goal of a linear sketch is to minimize r to well-approximate a large class of queries with high probability.

Linear sketches are powerful algorithmic tools that can be used for a wide variety of applications including norm estimation over data streams, compressed sensing, and distributed computing. Linear sketches turn an n-dimensional input into a concise lower-dimensional representation via a linear transformation. Linearity is required for performing updates or estimating statistics on differences of two datasets. Currently, linear sketches are widely used for answer number of distinct elements, top-k queries, histograms, etc, In almost any realistic setting, however, a linear sketch faces the possibility that its inputs are correlated with previous evaluations of the sketch.

BRIEF SUMMARY

Embodiments include a method, computer program product and system for identifying a sketching matrix used by a linear sketch. Aspects include receiving an initial output of the linear sketch, generating a query vector and inputting the query vector into the linear sketch. Aspects further include receiving an revised output of the linear sketch based on inputting the query vector and iteratively repeating the steps of generating the query vector, inputting the query vector into the linear sketch, and receiving an revised output of the linear sketch based on inputting the query vector until the sketching matrix used by the linear sketch can be identified.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 3 depicts algorithm for reconstruction attack on linear sketches in accordance with an exemplary embodiment.

DETAILED DESCRIPTION

Embodiments include methods and computer program products for determining the sketching matrix that is used by a linear sketch. The sketching matrix A is of the form r×n, for $r \ll n$, where r and n are application-specific parameters. The method includes receiving an output of the linear sketch and adaptively choosing query vectors $x_1, \ldots, x_s$ that are then input into the linear sketch. After each input vector is applied, the method receives the output of the linear sketch, $f(A*x^i)$, for an appropriate application-specific function $f$. Based on this information, the method generates an approximation of A. In exemplary embodiments, the approximation of the sketching matrix, A, is generated based on a small number of queries s.

In exemplary embodiments, the method can be used to learn the sketching matrix A utilized by the linear sketch, and thereby break the guarantees provided by the linear sketching application. In other words, once the sketching matrix A used by the linear sketch is known, a series of queries or inputs can be used to manipulate the output of the linear sketch such that the output of the linear sketch no longer accurately represents the input data.

Figure 1:
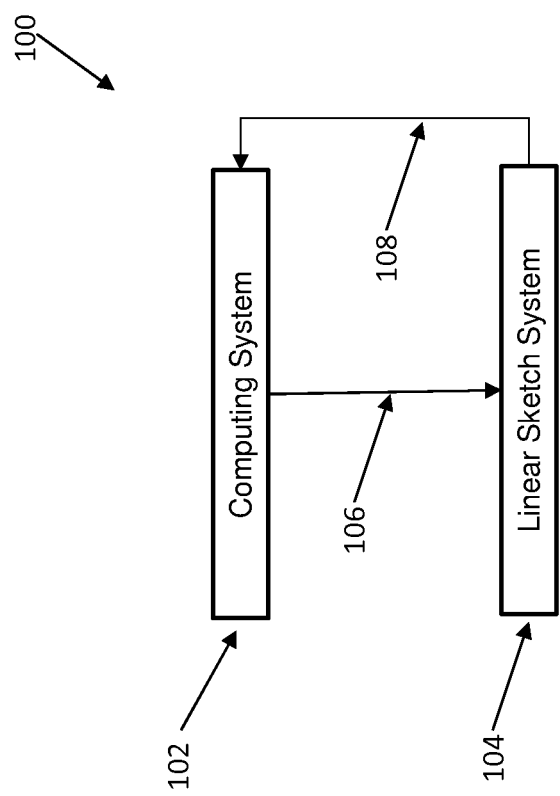
FIG. 1 depicts a block diagram of a system for identifying a sketching matrix used by a linear sketch in accordance with an exemplary embodiment.

Referring now to FIG. 1, a block diagram of a system 100 for identifying a sketching matrix used by a linear sketch in accordance with an exemplary embodiment is shown. As illustrated, the system 100 includes a computing system 102 that is in communication with linear sketch system 104. In exemplary embodiments, the computing system 102 generates a query 106 that is input into the linear sketch system 104. In response to the query 106, the linear sketch system 104 generates an output 108 based on a sketching matrix A used by the linear sketch system 104. In exemplary embodiments, the output 108 is received by the computing system 102 which uses the output to generate another query 106. In exemplary embodiments, the computing system 102 and linear sketch system 104 may be computing systems such as the one described in more detail with reference to FIG. 4 below.

Figure 2:
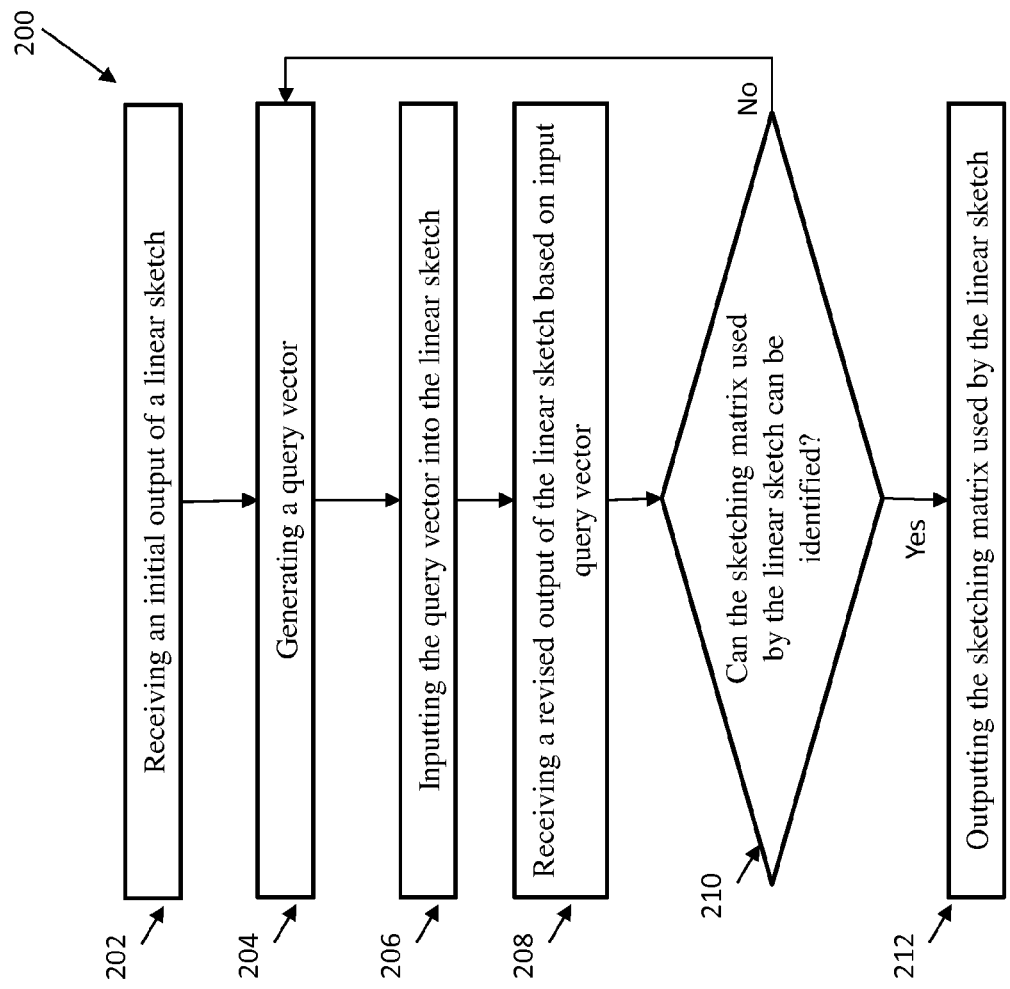
FIG. 2 depicts a process flow for identifying a sketching matrix used by a linear sketch in accordance with an exemplary embodiment.

Referring now to FIG. 2, a flow diagram of a method 200 for identifying a sketching matrix used by a linear sketch in accordance with an exemplary embodiment is shown. In one embodiment, the method 200 includes receiving an initial output of the linear sketch, as shown at block 202. Next, as shown at block 204, the method 200 includes generating a query vector. The query vector is then input into the linear sketch, as shown at block 206. The method 200 also includes receiving a revised output of the linear sketch based on inputting the query vector, as shown at block 208. Next, at decision block 210, the method 200 includes determining if the sketching matrix used by a linear sketch can be identified. If the sketching matrix used by a linear sketch can be identified, the method concludes at block 212 by outputting the sketching matrix used by the linear sketch. Otherwise, the method returns to block 204 and iteratively repeats the steps of generating the query vector, inputting the query vector into the linear sketch, and receiving a revised output of the linear sketch based on inputting the query vector until the sketching matrix used by the linear sketch can be identified. In exemplary embodiments, the query vector input into the linear sketch is based on the revised output of the linear sketch received during a prior iteration.

In exemplary embodiments, the sketching matrix has a form of r×n, where r<<n. The number of iteration of required until the sketching matrix used by a linear sketch can be identified is defined as s. In exemplary embodiments, s is a function of n that can be represented as first degree polynomial. In exemplary embodiments, the query vector into the linear sketch is based on the revised output of the linear sketch received during a prior iteration.

In exemplary embodiments, the query vector is selected from a query distribution that is a Gaussian distribution having a varying covariance structure and an amount of Gaussian noise may be added to the query distribution to reduce an approximation error. In exemplary embodiments, the query vector is selected from a multivariate normal distribution $N(0, \tau I_n)$, where $\tau I_n$ is a covariance matrix, which is a scalar $\tau$ times the identity matrix $I_n$.

Given a subspace $V \subseteq \mathbb{R}^n$, the orthogonal projection operator $P_V$ is projected onto the space V. The orthogonal complement of a linear space V is denoted by $V^\perp$. When X is a distribution, x~X is used to indicate that x is a random variable selected according to the distribution X. The d-dimensional Gaussian distribution can be denoted with mean $\mu \in \mathbb{R}^d$ and independent coordinates with variance $\sigma^2 \in \mathbb{R}$ by $N(\mu, \sigma^2)^d$. The statistical distance (or total variation distance) between two distributions X,Y is denoted by $\|X-Y\|_{tv}$.

A linear sketch is given by a distribution M over r×n matrices and an evaluation mapping F: $\mathbb{R}^{r \times n} \times \mathbb{R}^r \to R$ where R is some output space which is chosen to be R={0;1}. The algorithm initially samples a matrix A~M. The answer to each query $x \subseteq \mathbb{R}^n$ is then given by F(A,Ax). Since the evaluation map F is not restricted in any way, the concrete representation of A as a matrix is not important. A is therefore identified with its image, an r-dimensional subspace of $\mathbb{R}^n$ (w.l.o.g. A has full row rank). In this case, an instance of a sketch can be written as a mapping $f: \mathbb{R}^r \to R$ satisfying the identity $f(x)=f(P_A x)$. In this case, $f: A \to \{0,1\}$ even though $f$ is defined on all of $\mathbb{R}^n$ via orthogonal projection onto A.

In exemplary embodiments, assuming a linear sketch is characterized by the following promise: GAPNORM(B) for an input vector $x \in \mathbb{R}^n$, output 0 if $\|x\|_2 \leq 1$ and output 1 if $\|x\|_2 \geq B$, where $B \geq 1$ is a parameter. If x satisfies neither of these two conditions, the output of the algorithm is allowed to be 0 or 1. There is a randomized algorithm which, given a parameter $B \geq 2$ and access to a linear sketch that uses at most r=n−O(log (nB)) rows, with high probability finds a distribution over queries on which the linear sketch fails to solve GAPNORM(B) with constant probability.

In exemplary embodiments, the algorithm makes at most poly(rB) adaptively chosen queries to the linear sketch and runs in time poly(rB). Moreover, the algorithm uses only r "rounds of adaptivity" in that the query sequence can be partitioned into at most r sequences of non-adaptive queries. In exemplary embodiments, the algorithm succeeds on every linear sketch with high probability. In particular, it can be implied that a distribution over sketching matrices can not be designed with at most r rows so as to output a value in the range $[\|x\|_2, B\|x\|_2]$, that is, a B-approximation to $\|x\|_2$, and be correct with constant probability on an adaptively chosen sequence of poly(rB) queries. This is unless the number r of rows in the sketch is n−O(log(nB)), which agrees with the trivial r=n upper bound up to a low order term. Here B can be any arbitrary approximation factor that is only required to be polynomially bounded in n (as otherwise the running time would not be polynomial). In exemplary embodiments, the algorithm makes arguably very natural queries as they are all selected from Gaussian distributions with varying covariance structure.

In exemplary embodiments, the queries submitted to the linear sketch can be grouped into fewer than r rounds, where in each round the queries made are independent of each other conditioned on previous rounds. For example, if o(r/log r) rounds were used, the sketching algorithm could partition the rows of A into o (r/log r) disjoint blocks of ω(log r) coordinates, and use the i-th block alone to respond to queries in the i-th round. If the rows of A were independent and identically distributed normal random variables, one can show that this would require a super-polynomial (in r) number of non-adaptive queries to break, even for constant B. Moreover, the algorithm has time complexity polynomial in r and B, and therefore rules out the possibility of using cryptographic techniques secure against polynomial time algorithms.

In exemplary embodiment, the algorithm uses query vectors x which are O(r)-dimensional for B≤exp(r). For such vectors, $\Omega(r^{-1/2}\|x\|_2) \leq \|x\|_p \leq O(r^{1/2}\|x\|_2)$, for all $1 \leq p \leq \infty$. Accordingly, no linear sketch with n−ω(log n) rows approximates the $l_p$-norm to within a fixed polynomial factor on a sequence of polynomially many adaptively chosen queries. Assuming $C \geq 1$, no linear sketch with $o(n/C^2)$ rows guarantees $l_2/l_2$-recovery on a polynomial number of adaptively chosen inputs. More precisely, an input x for which the output x' of the sketch does not satisfy $\|x-x'\|_2 \leq C\|x_{tail(1)}\|_2$ can be found with probability ⅔. For constant approximation factors C, this shows one cannot do asymptotically better than storing the entire input. For larger approximation factors C, the dependence of the number of rows on C in this corollary is essentially best possible (at least for small k).

Referring now to FIG. 3, an algorithm for a reconstruction attack on linear sketches in accordance with an exemplary embodiment is shown. The algorithm iteratively builds a subspace $V_t$ that is approximately contained in the unknown subspace A. In each round the algorithm queries A on a sequence, or vector, of queries chosen from the orthogonal complement of $V_t$. As the dimension of $V_t$ grows larger, the linear sketch must make a mistake.

In exemplary embodiments, a function $f: \mathbb{R}^n \to \{0; 1\}$ that depends only on a lower dimensional subspace can not correctly predict the $l_2^2$-norm up to a factor B on a polynomial number of adaptively chosen inputs. Here, B can be any factor and the complexity of our attack will depend on B and the dimension of the subspace. In exemplary embodiments, no function can predict the $l_2^2$-norm on a natural sequence of distributions even if the function errors on each distribution with inverse polynomial probability.

In one embodiment, let $B \geq 8$ and let $f: \mathbb{R}^n \to \{0; 1\}$. A pair $(V, \sigma^2)$ is a d-dimensional failure certificate for $f$ if $V \subseteq \mathbb{R}^n$ is d-dimensional subspace and $\sigma^2 \in [0, 2B]$ such that for some constant C>0; we have n≥d+10 C log(Bn) and moreover, either $\sigma^2 \in [B/2, 50B]$ and $P_{g \sim G(V^\perp, \sigma^2)}\{f(g)=1\} \leq 1-(Bn)^{-C}$, or $\sigma^2 \leq 2$ and $P_{g \sim G(V^\perp, \sigma^2)}\{f(g)=1\} \geq n^{-C}$. A failure certificate always gives rise to a distribution over which $f$ does not decide the GAPNORM problem up to a factor (B) on a polynomial number of queries.

Given a d-dimensional failure certificate for $f$, we can find with poly(Bn) non-adaptive queries with probability ⅔ an input x such that either $\|x\|^2 \geq B(n-d)/3$ and $f(x)=0$ or $\|x^2\| \leq 3$ (n−d) and $f(x)=1$. Sample O((Bn)C) queries from $G(V^\perp, \sigma^2)$, suppose $\sigma^2 \leq 2$, since n−d is sufficiently large compared to d; by a union bound and Gaussian concentration, with high probability simultaneously for all queries x; $\|x\|^2 \leq 3(n-d)$. On the other hand, with high probability, $f$ outputs 1 on one of the queries. The case where $\sigma^2 \geq B/2$ follows with the analogous argument.

In one embodiment, let $B \geq 8$ and let $A \subseteq \mathbb{R}^n$ be a r-dimensional subspace of $\mathbb{R}^n$ such that $n \geq r+90 \log(Br)$. Assuming that $B \leq \text{poly}(n)$, let $f: \mathbb{R}^n \to \{0; 1\}$ satisfying $f(x) = f(P_A x)$ for all $x \in \mathbb{R}^n$, then, there is an algorithm that given only access to the output of the linear sketch ($f$) finds with probability 9/10 a failure certificate for $f$. The time and query complexity of the algorithm is bounded by $\text{poly}(B,r)$. Moreover, all queries that the algorithm makes are sampled from $G(V^\perp, \sigma^2)$ for some $V \subseteq \mathbb{R}^n$ and $\sigma^2 \in (0, B]$.

It can be assumed without loss of generality that $n = r+90 \log(Br)$ by working with the first $r+90 \log(Br)$ coordinates of $\mathbb{R}^n$. This ensures that a polynomial dependence on n is also a polynomial dependence on r. For each $1 \leq t \leq t$, let $W_t \subseteq A$ be the closest $(t-1)$-dimensional subspace to $V_t$ that is contained in A. Formally, $W_t$ satisfies:

$$d(V_t, W_t) = \min\{d(V_t, W): \dim(W) = t-1, W \subseteq A\}.$$

The following invariant at step t is true during the attack:

$$dim(V_t) = t-1 \text{ and } d(V_t, W_t) \leq \frac{t}{20(Bn)^{3.5} \log(Bn)^{2.5}}.$$

The invariant holds vacuously at step 1; since $V_1 = \{0\} \subseteq A$. Whenever the invariant holds in a step t:

$$d(V_t, W_t) \leq \frac{1}{20B^{3.5}n^{2.5}\log(Bn)^{2.5}}.$$

Hence, for every $\sigma^2 \in (0, B]$, $$\|G(V_t^\perp, \sigma^2) - G(W_t^\perp, \sigma^2)\|_{tv} \leq$$

$$20\sqrt{Bn\log(Bn)} \cdot d(V_t, W_t) + \frac{1}{(Bn)^5} \leq \frac{1}{B^3 n^2 \log(Bn)^2}.$$

In one embodiment, assume that the invariant holds at step t. Then, if $f$ is $(\alpha; B)$-correct on $V_t^\perp$, then $f$ is $(\alpha+\epsilon; B)$-correct on $W_t^\perp$. For every $\sigma^2 \in (0, B]$, the statistical distance between $G(V_t^\perp, \sigma^2)$ and $G(W_t^\perp, \sigma^2)$ is at most $\epsilon$. Let E denote the event that the empirical estimate $s(t, \sigma^2)$ is accurate at all steps of the algorithm, then:

$$\forall t \forall \sigma^2 \in S: \left| s(t, \sigma^2) - \underset{G(V_t^\perp, \sigma^2)}{P} \{f(g) = 1\} \right| \leq \varepsilon.$$

In one embodiment, $P\{E\} \geq 1 - \exp(-n)$ which follows from a standard application of the Chernoff bound, since the number of samples chosen is $m >> (Bn/\epsilon)^2$. Under the condition that E occurs, the following is true: if the algorithm terminates in round t and outputs $G(V_t^\perp, \sigma^2)$, then $G(V_t^\perp, \sigma^2)$ is a failure certificate for $f$. Moreover, if the algorithm does not terminate in round t in round t, then $f$ is B-correct on $W^\perp$. The first claim follows directly from the definition of a failure certificate and the condition that the empirical error given by $s(t, \sigma^2)$ is $\epsilon$-close to the actual error. Indeed by the condition E and the assumption that the algorithm did not terminate, $f$ is $(2\epsilon, B)$-correct on $V_t^\perp$. This implies that $f$ is $(3\epsilon, B)$-correct on $W_t^\perp$. Note that $3\epsilon \leq 1/10 (Bn)^2$ and hence $f$ is correct on W.

In one embodiment, let $t \leq r$ and assume that the invariant holds in round t and that $f$ is B-correct on $W_t^\perp$. Then, with probability $1 - 1/n^2$ the invariant holds in round $t+1$. Suppose that the invariant holds for $t = r+1$. Then, $f$ is not B-correct on $W_r$. Since $t = r+1$ and the invariant holds, $\dim(V_t) = \dim(W_t) = r$. On the other hand $W_t \subseteq A$ and $\dim(A) = r$. Hence, $W_t = A$. Therefore, the function $f$ cannot distinguish between samples from $G(W_t^\perp, 2)$ and samples from $G(W_t^\perp, B)$. Thus, $f$ must make a mistake with constant probability on one of the distributions.

Conditioned on the event that E occurs and since E has probability $1 - \exp(-n)$, this affects the success probability of the algorithm only by a negligible amount. Under this condition, if the algorithm terminates in a round t with $t \leq r$, then the algorithm actually outputs a failure certificate for $f$. On the other hand, suppose that the algorithm does not terminate in any of the rounds $t \leq r$. This means that in each round t it must be the case that $f$ is correct on $W_t^\perp$ assuming that the invariant holds at step t. In this case, the invariant continues to hold in round $t+1$. Since the invariant holds in step 1, it follows that if the algorithm does not terminate prematurely, then with probability $(1 - 1/n^2)^r \geq 1 - 1/n$ the invariant still holds at step $r+1$. But in this case, $W_{r+1}$ is not correct for $f$ and a failure certificate is output with probability $1 - \exp(-n)$. Combining the two possible cases, it follows that the algorithm successfully finds a failure certificate for $f$ with probability $1 - 2/n$.

In exemplary embodiments, the query complexity is polynomially bounded in n and hence also in r since we assume that $n \leq O(r)$. Computationally, the only non-trivial step is finding the vector $v_o$ that maximizes $$z(v) = \frac{1}{m'} \sum_{i=1}^{m'} \langle v_\sigma, g_i \rangle^2.$$

In one embodiment, this vector can be found efficiently using singular vector computation. Indeed, let G be the m'×n matrix that has $g_1, \ldots, g_{m'}$ as its rows. The top singular vector v of G, by definition, maximizes $\|Gv\|^2 = \sum_{i=1}^{m'} \langle g_i, v \rangle^2$. Hence, it must also maximize the $z(v)$. This shows that the attack can be implemented in time polynomial in r.

In an exemplary embodiment, the method for identifying a sketching matrix used by a linear sketch can be illustrated in the context of a game between two parties, Alice and Bob. Assume Alice chooses an r×n matrix A from distribution $\pi$. Bob makes a sequence of queries $x^1, \ldots, x^s \in \mathbb{R}^n$ to Alice, who only sees $Ax^i$ on query i. Alice responds by telling Bob the value $f(Ax^i)$. In exemplary embodiments, $f$ is an arbitrary function here that need not be efficiently computable. Bob's goal is to learn the row space R(A) of Alice, namely the at most r-dimensional subspace of $\mathbb{R}^n$ spanned by the rows of A. If Bob knew R(A), he could, with probability 1/2 query $0^n$ and with probability 1/2 query a vector in the kernel of A. Since Alice cannot distinguish the two cases, and since the norm in one case is 0 and in the other case non-zero, she cannot provide a relative error approximation.

In exemplary embodiments, an algorithm for identifying a sketching matrix (which can be executed efficiently by Bob) that learns $r - O(1)$ orthonormal vectors that are almost contained in R(A). While this does not give Bob a vector in the kernel of A, it effectively reduces Alice's row space to be constant dimensional thus forcing her to make a mistake on sufficiently many queries.

In exemplary embodiments, in order to learn R(A), Bob's initial query is selected from the multivariate normal distribution $N(0,\tau I_n)$, where $\tau I_n$ is the covariance matrix, which is a scalar $\tau$ times the identity matrix $I_n$. This ensures that Alice's view of Bob's query x, namely, the projection $P_A x$ of x onto R(A), is spherically symmetric, and so only depends on $\|P_A x\|_2$. Given $\|P_A x\|_2$, Alice needs to output 0 or 1 depending on what she thinks the norm of x is. The intuition is that since Alice has a proper subspace of $\mathbb{R}^n$, she will be confused into thinking x has larger norm than it does when $\|P_A x\|_2$ is slightly larger than its expectation (for a given $\tau$), that is, when x has a non-trivial correlation with R(A). Accordingly, it can be shown that there exists a choice of $\tau$ for which $E_{x \sim N(0,\tau Id_r)}[\|P_A x\|_2^2 | f(Ax)=1] - E_{x \sim N(0,\tau Id_r)}[\|P_A x\|_2^2$ is non-trivially large. This is done by showing that the sum of this difference over all possible $\tau$ in a range [1,B] is noticeably positive, where B is an approximation factor that can be tolerated. In particular, there exists a $\tau$ for which this difference is large. To show the sum is large, for each possible condition $v = \|P_A x\|_2^2$ there is a probability q(v) that the algorithm outputs 1, and over all $\tau$, q(v) contributes both positively and negatively to the above difference based on v's weight in the $\chi^2$-distribution with mean r$\tau$. The overall contribution of v can be shown to be zero. Moreover, by correctness of the sketch, q(v) must typically be close to 0 for small values of v, and typically close to 1 for large values of v. Therefore q(v) zeros out some of the negative contributions that v would otherwise make and ensures some positive contributions in total.

In exemplary embodiment, many independently chosen $x^i$ for which each $x^i$ has a slightly increased expected projection onto Alice's space R(A) can be identified. At this point, these slight correlations are aggregated into a single vector which has very high correlation with R(A) by arranging all m=poly(n) positively labeled vectors $x^i$ into an m×n matrix G and computing the top right singular vector v* of G. This aggregation can be done efficiently, indeed, $\|P_A v^*\| \geq 1 - 1/\text{poly}(n)$. In other words v* is almost entirely contained in R(A). This step effectively reduce the dimension of Alice's space by 1.

After finding one vector inside Alice's space, the method is not complete. In some cases, the linear sketch used by Alice might initially use only a small fraction of rows and switch to a new set of rows after Bob learned her initial rows. Accordingly, the method includes iterating the previously described algorithm as follows. Bob now makes queries from a multivariate normal distribution inside of the subspace orthogonal to the previously found vector. In this way, the dimension of Alice's space has been effectively reduced by 1, and the algorithm is repeated until her space is of constant dimension, at which point a standard non-adaptive attack is enough to break the sketch. In exemplary embodiments, each vector that is found is only approximately contained in R(A), this approximation error could help Alice and should be ruled out. In one embodiment, the approximation error can be ruled out by adding a sufficient amount of global Gaussian noise to the query distribution. This has the effect of making the distribution statistically indistinguishable from a query distribution defined by vectors that are exactly contained in Alice's space.

Figure 4:
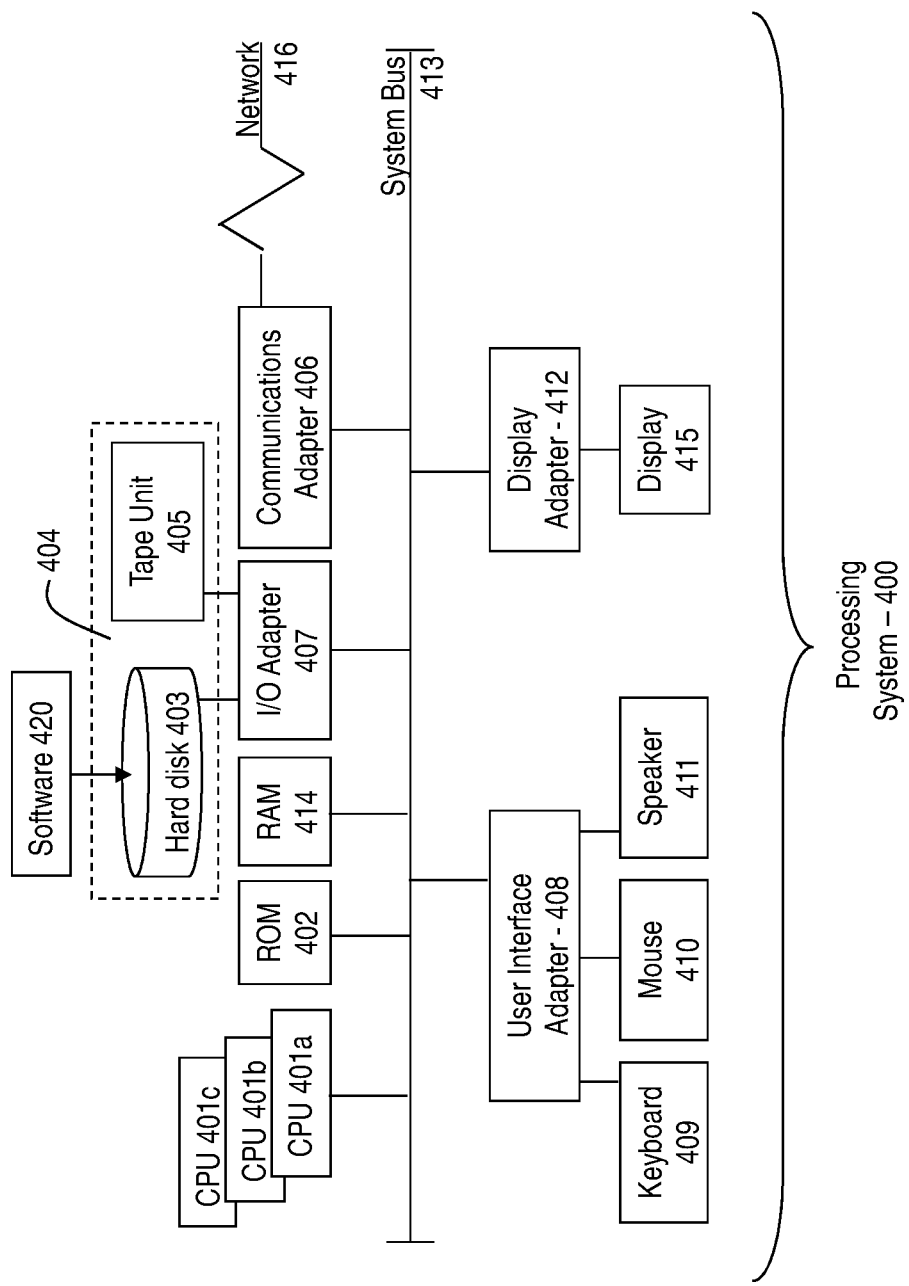
FIG. 4 depicts a processing system for practicing the teachings herein in accordance with an exemplary embodiment.

Referring to FIG. 4, there is shown an embodiment of a processing system 400 that may be used implementing the teachings herein. In this embodiment, the system 400 has one or more central processing units (processors) 401a, 401b, 401c, etc. (collectively or generically referred to as processor(s) 401). In one embodiment, each processor 401 may include a reduced instruction set computer (RISC) microprocessor. Processors 401 are coupled to system memory 414 and various other components via a system bus 413. Read only memory (ROM) 402 is coupled to the system bus 413 and may include a basic input/output system (BIOS), which controls certain basic functions of system 400.

FIG. 4 further depicts an input/output (I/O) adapter 407 and a network adapter 406 coupled to the system bus 413. I/O adapter 407 may be a small computer system interface (SCSI) adapter that communicates with a hard disk 403 and/or tape storage drive 405 or any other similar component. I/O adapter 407, hard disk 403, and tape storage device 405 are collectively referred to herein as mass storage 404. Software 120 for execution on the processing system 400 may be stored in mass storage 404. A network adapter 406 interconnects bus 413 with an outside network 416 enabling data processing system 400 to communicate with other such systems. A screen (e.g., a display monitor) 415 is connected to system bus 413 by display adaptor 412, which may include a graphics adapter to improve the performance of graphics intensive applications and a video controller. In one embodiment, adapters 407, 406, and 412 may be connected to one or more I/O busses that are connected to system bus 413 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 413 via user interface adapter 408 and display adapter 412. A keyboard 409, mouse 140, and speaker 411 all interconnected to bus 413 via user interface adapter 408, which may include, for example, a Super I/O chip integrating multiple device adapters into a single integrated circuit.

Thus, as configured in FIG. 4, the system 400 includes processing capability in the form of processors 401, storage capability including system memory 414 and mass storage 404, input means such as keyboard 409 and mouse 140, and output capability including speaker 411 and display 415. In one embodiment, a portion of system memory 414 and mass storage 404 collectively store an operating system such as the AIX® operating system from IBM Corporation to coordinate the functions of the various components shown in FIG. 4.

Technical effects and benefits include the ability to learn the sketching matrix A used by the linear sketch, and thereby break the guarantees provided by these applications. In other words, once the sketching matrix A used by the linear sketch is known, a series of queries or inputs can be used to manipulate the output of the linear sketch such that the output of the linear sketch no longer accurately represents the input data.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for identifying a sketching matrix used by a linear sketch comprising:
receiving, by a processor, an initial output of the linear sketch;
generating, by the processor, a query vector;
inputting, by the processor, the query vector into the linear sketch;

receiving, by the processor, an revised output of the linear sketch based on inputting the query vector;

iteratively repeating the steps of generating the query vector, inputting the query vector into the linear sketch, and receiving an revised output of the linear sketch based on inputting the query vector until the sketching matrix used by the linear sketch can be identified.

2. The method of claim 1, wherein inputting the query vector into the linear sketch is based on the revised output of the linear sketch received during a prior iteration.

3. The method of claim 1, wherein the sketching matrix has a form of r×n, where r<<n.

4. The method of claim 3, wherein the number of iterations required until the sketching matrix used by a linear sketch can be identified is a function of n that can be represented as first degree polynomial.

5. The method of claim 1, wherein the query vector is selected from a query distribution that is a Gaussian distribution having a varying covariance structure.

6. The method of claim 5, wherein an amount of Gaussian noise is added to the query distribution to reduce an approximation error.

7. The method of claim 1, wherein the query vector is selected from a multivariate normal distribution $N(0, \tau I_n)$, where $\tau I_n$ is a covariance matrix, which is a scalar $\tau$ times the identity matrix $I_n$.

8. A computer program product for identifying a sketching matrix used by a linear sketch, the computer program product comprising:

a non-transitory computer readable storage medium having program code embodied therewith, the program code executable by a processor to:

receiving an initial output of the linear sketch;

generating a query vector;

inputting the query vector into the linear sketch;

receiving an revised output of the linear sketch based on inputting the query vector;

iteratively repeating the steps of generating the query vector, inputting the query vector into the linear sketch, and receiving an revised output of the linear sketch based on inputting the query vector until the sketching matrix used by the linear sketch can be identified.

9. The computer program product of claim 8, wherein inputting the query vector into the linear sketch is based on the revised output of the linear sketch received during a prior iteration.

10. The computer program product of claim 8, wherein the sketching matrix has a form of r×n, where r<<n.

11. The computer program product of claim 10, wherein the number of iterations required until the sketching matrix used by a linear sketch can be identified is a function of n that can be represented as first degree polynomial.

12. The computer program product of claim 8, wherein the query vector is selected from a query distribution that is a Gaussian distribution having a varying covariance structure.

13. The computer program product of claim 12, wherein an amount of Gaussian noise is added to the query distribution to reduce an approximation error.

14. The computer program product of claim 8, wherein the query vector is selected from a multivariate normal distribution $N(0, \tau I_n)$, where $\tau I_n$ is a covariance matrix, which is a scalar $\tau$ times the identity matrix $I_n$.

15. A computing system for identifying a sketching matrix used by a linear sketch system, the system comprising a processor configured to:

receive an initial output of the linear sketch;

generate a query vector;

input the query vector into the linear sketch;

receive an revised output of the linear sketch based on inputting the query vector;

iteratively repeat the steps of generating the query vector, inputting the query vector into the linear sketch, and receiving an revised output of the linear sketch based on inputting the query vector until the sketching matrix used by the linear sketch can be identified.

16. The computing system of claim 15, wherein inputting the query vector into the linear sketch is based on the revised output of the linear sketch received during a prior iteration.

17. The computing system of claim 15, wherein the sketching matrix has a form of r×n, where r<<n.

18. The computing system of claim 17, wherein the number of iterations required until the sketching matrix used by a linear sketch can be identified is a function of n that can be represented as first degree polynomial.

19. The computing system of claim 15, wherein the query vector is selected from a query distribution that is a Gaussian distribution having a varying covariance structure.

20. The computing system of claim 19, wherein an amount of Gaussian noise is added to the query distribution to reduce an approximation error.

* * * * *